United States Patent

Saito et al.

[11] Patent Number: 5,402,025
[45] Date of Patent: Mar. 28, 1995

[54] ROTOR PROVIDED WITH A RING-SHAPED MAGNET

[75] Inventors: Makoto Saito; Yasuaki Kasai, both of Nagoya; Hiyoshi Yamada, Iwakura; Norio Yoshikawa, Nagoya, all of Japan

[73] Assignee: Daido Tokushuko Kabushiki Kaisha, Nagoya, Japan

[21] Appl. No.: 168,209

[22] Filed: Dec. 17, 1993

[51] Int. Cl.⁶ .............................................. H02K 21/12
[52] U.S. Cl. ...................................... 310/156; 310/64; 310/261
[58] Field of Search ................. 310/261, 262, 156, 64, 310/216, 152, 181

[56] References Cited

U.S. PATENT DOCUMENTS

| | | | |
|---|---|---|---|
| 3,226,579 | 12/1965 | Bygdnes | 310/156 |
| 3,914,629 | 10/1975 | Gardiner | 310/156 |
| 4,625,135 | 11/1986 | Kasabian | 310/156 |
| 4,841,186 | 6/1989 | Feigel | 310/156 |
| 4,874,975 | 10/1989 | Hertrich | 310/156 |
| 5,142,180 | 8/1992 | Moore | 310/261 |
| 5,260,616 | 11/1993 | Mizutani | 310/156 |

*Primary Examiner*—R. Skudy
*Attorney, Agent, or Firm*—Sughrue, Mion, Zinn, Macpeak & Seas

[57] ABSTRACT

A rotor comprises a rotor body and a ring-shaped rare earth metal-iron type magnet arranged therearound, in which a low thermal-expansion material is inserted between the rotor body and the magnet.

4 Claims, 2 Drawing Sheets

ROTOR PROVIDED WITH A RING-SHAPED MAGNET

BACKGROUND OF THE INVENTION

1. Field of the Invention

This invention relates to a rotor used for motors such as AC servo motor, brushless motor and the like, and more particularly to a rotor provided with a rare earth metal-iron type ring-shaped magnet.

2. Description of the Related Art

Heretofore, a rotor provided with a magnet has been used in motors such as AC servo motor, brushless motor and the like. In this case, the magnet is commonly used by combining a plurality of arc-shapedly divided magnet segments in a circumferential direction. As the magnet, it strongly tends to use rare earth metal-iron type magnets having good magnetic properties.

When a plurality of such arc-shapedly divided magnet segments is assembled on a rotor body to provide a rotor, the assembling efficiency of the divided magnet segments on the rotor body is good, but the formation of magnetic pole is dependent upon the shape of the magnet divided into arc or the like.

For this end, it is attemped to optionally conduct the setting of the magnetic pole by using a ring-shaped rare earth metal-iron type magnet without dividing into arc or the like.

However, when such a ring-shaped rare earth metal-iron type magnet is assembled on the rotor body, the thermal expansion coefficient of the ring-shaped rare earth metal-iron type magnet is small, while the thermal expansion coefficient of the rotor body (e.g. made from S45C, SUS403, Al or the like) is large, so that if the temperature of the rotor rises, the thermal expansion quantity of the rotor body becomes larger than that of the ring-shaped rare earth metal-iron type magnet, and hence the cracking or breakage is undesirably caused in the ring-shaped rare earth metal-iron type magnet.

In order to solve this problem, it is attempted to form a large gap between the rotor body and the ring-shaped rare earth metal-iron type magnet or to insert an adhesive into such a large gap. In this case, however, the concentric accuracy between the rotor body and the ring-shaped rare earth metal-iron type magnet may lower due to the formation of the large gap or the degradation of the adhesive, so that these attempts are not effective at the present time.

Further, in order to prevent the scattering of broken ring-shaped rare earth metal-iron type magnet or to improve the corrosion resistance of the rare earth metal-iron type magnet having a poor corrosion resistance in the motor requiring the high reliability, a coating for the prevention of the scattering and the improvement of the corrosion resistance may be arranged around the outer peripheral surface of the ring-shaped magnet, but when the thermal expansion coefficient of the coating is large, if the rotor is placed in a low-temperature environment, the thermal shrinkage quantity of the coating becomes larger than that of the ring-shaped rare earth metal-iron type magnet, and hence the cracking or breakage is caused in the ring-shaped rare earth metal-iron type magnet.

SUMMARY OF THE INVENTION

It is, therefore, an object of the invention to solve the aforementioned problems of the conventional technique and to provide a rotor capable of sufficiently maintaining the concentric accuracy between the rotor body and the ring-shaped rare earth metal-iron type magnet and the good corrosion resistance of the magnet over a long period without causing the cracking or breakage of the magnet even if the temperature of the rotor rises or the rotor is placed in a low-temperature environment.

According to the invention, there is the provision of a rotor comprising a rotor body and a ring-shaped rare earth metal-iron type magnet arranged therearound, in which a low thermal-expansion material is inserted between the rotor body and the magnet.

In a preferred embodiment of the invention, a low thermal-expansion material is further arranged on the outer peripheral surface of the ring-shaped rare earth metal-iron type magnet.

DESCRIPTION OF THE PREFERRED EMBODIMENTS

In the rotor provided with the ring-shaped rare earth metal-iron type magnet according to the invention, carbon steel, low alloy steel, strainless steel and the like are used as a rotor body. For example, S45C as a carbon steel, SUS403 as a martensitic stainless steel and the like are used. Further, aluminum material may be used. Almost of these materials has a thermal expansion coefficient of about $8-25 \times 10^{-6}/°C.$, more particulary about $10-20 \times 10^{-6}/°C.$ As the rare earth metal-iron type magnet, there are used R—Fe system, R—Fe—B system, R—Fe—N system and the like (R is one or more of rare earth metal elements), in which Ni, Mn and Co are included in Fe and a proper element may be included in B or used instead of B, for example, at least one of C, N, P, Si. A greater part of these systems have a thermal expansion coefficient of not more than about $3 \times 10^{-6}/°C.$ (including minus coefficient).

As the low thermal expansion material, there are used Fe—Ni system, Fe—Ni—Co system, Fe—B system, Fe—Cr—B system and the like. A greater part of these systems have a thermal expansion coefficient of not mroe than about $5 \times 10^{-6}/°C.$ (including minus coefficient). Concretely, there are Fe-36% Ni (Invar), Fe-29% Ni-17% Co (Kovar), Fe-42% Ni and the like.

In the rotor according to the invention, the low thermal-expansion inside material is inserted between the rotor body and the ring-shaped magnet, so that the magnetic pole can be easily set at an optional position, while even when the temperature of the rotor rises and the difference in thermal expansion between the rotor body and the ring-shaped magnet occurs, the thermal expansion difference is absorbed by the low thermal-expansion inside material, therefore, the cracking or breakage of the ring-shaped magnet based on the difference of thermal expansion coefficient between the rotor body and the ring-shaped magnet is prevented.

In the preffered embodiment of the invention, the low thermal-expansion outside material is further arranged on the outer peripheral surface of the ring-shaped magnet, so that even when the rotor is placed in a low-temperature environment, the difference in thermal shrinkage between the ring-shaped magnet and the low thermal-expansion outside material is small. Therefore, the cracking and breakage of the ring-shaped magnet is prevented, and also even if the ring-shaped magnet is broken, the scattering of the broken magnet is prevented by the low-expansion outside material, and further the corrosion resistance in the ring-shaped magnet having a poor corrosion resistance can satisfactorily be maintained over a long time.

The following examples are given in illustration of the invention and are not intended as limitations thereof.

EXAMPLE 1

Figure 1:
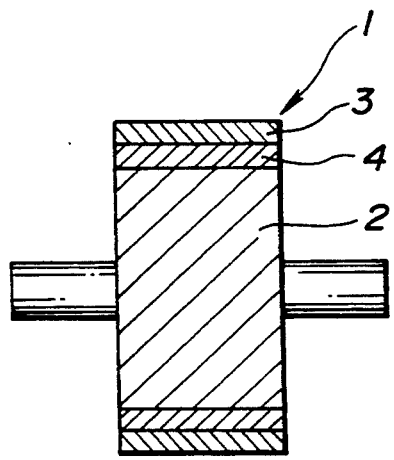
FIG. 1 is a diagrammatically sectional view of a first embodiment of a rotor provided with a ring-shaped magnet according to the invention.

FIG. 1 shows a first embodiment of a rotor provided with a ring-shaped magnet according to the invention, in which numeral 1 is a rotor, numeral 2 is a rotor body, numeral 3 is a ring-shaped rare earth metal-iron type magnet and numeral 4 is a low thermal-expansion inside material inserted between the rotor body 2 and the ring-shaped magnet 3.

The rotor body 2 is made from a carbon steel of S45C, in which a large-diameter portion has a width of 30 mm and an outer diameter of 42.95 mm.

Furthermore, the ring-shaped rare earth metal-iron type magnet 3 is made from 28 wt % Nd-2 wt % Dy-0.9 wt % B-3 wt % Co-remainder being Fe and has a width of 30 mm, an outer diameter of 60 mm and an inner diameter of 54 mm.

In addition, the low thermal-expansion inside material 4 is made from 36 wt % Ni-remainder being Fe and has a width of 30 mm, an outer diameter of 53.95 mm and an inner diameter of 43 mm.

The low thermal-expansion inside material 4 is bonded to the rotor body 2 through an acrylic adhesive (trade name; LOCKTITE 325UV), while the ring-shaped rare earth metal-iron type magnet 3 is bonded to the low thermal-expansion inside material 4 through the same adhesive as mentioned above, whereby the rotor 1 according to the invention is formed.

After the rotor 1 is heated to 200° C., whether the cracking is caused in the ring-shaped rare earth metal-iron type magnet 3 is measured and consequently the occurrence of the cracking is not observed.

Comparative Example 1

Figure 2:
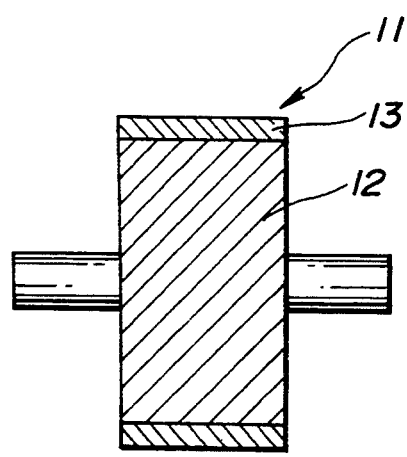
FIG. 2 is a diagrammatically sectional view of a first comparative prior art embodiment of a rotor provided with the ring-shaped magnet.

FIG. 2 shows a first comparative embodiment of the rotor, in which numeral 11 is a rotor, numeral 12 is a rotor body and numeral 13 is a ring-shaped rare earth metal-iron type magnet.

The rotor body 12 is made from a carbon steel of S45C, in which a large-diameter portion has a width of 30 mm and an outer diameter of 53.95 mm.

Furthermore, the ring-shaped rare earth metal-iron type magnet 13 is made from 28 wt % Nd-2 wt % Dy-0.9 wt % B-3 wt % Co-remainder being Fe and has a width of 30 mm, an outer diameter of 60 mm and an inner diameter of 54 mm.

The ring-shaped rare earth metal-iron type magnet 13 is bonded to the rotor body 12 through an acrylic adhesive (trade name: LOCKTITE 325UV) to form the rotor 11.

If it is intended to heat the rotor 11 to 200° C., the cracking is caused in the ring-shaped rare earth metal-iron type magnet 13 at a time of heating to 110° C.

EXAMPLE 2

Figure 3:
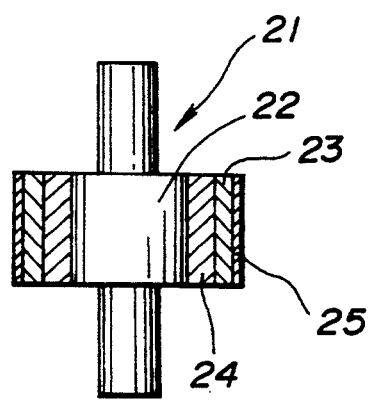
FIG. 3 is a diagrammatically sectional view of a second embodiment of a rotor provided with the ring-shaped magnet according to the invention.

FIG. 3 shows a second embodiment of the rotor provided with a ring-shaped magnet according to the invention, in which numeral 21 is a rotor, numeral 22 is a rotor body, numeral 23 is a ring-shaped rare earth metal-iron type magnet., numeral 24 is a low thermal-expansion inside material inserted between the rotor body 22 and the ring-shaped magnet 23 and numeral 25 is a low thermal-expansion outside material arranged on the outer peripheral surface of the ring-shaped magnet 23.

The rotor body 22 is made from a carbon steel of S45C, in which a large-diameter portion has a width of 20 mm and an outer diameter of 23 mm.

Furthermore, the ring-shaped rare earth metal-iron type magnet 23 is made from 28 wt % Nd-2 wt % Dy-0.8 wt % B-3 wt % Co-0.5 wt % Mo-0.1 wt % Ta-0.1 wt % C-remainder being Fe and has a width of 20 mm, an outer diameter of 40 mm and an inner diameter of 33 mm.

In addition, the low thermal-expansion inside material 24 is made from 42 wt % Ni-remainder being Fe and has a width of 20 mm, an outer diameter of 33 mm and an inner diameter of 23 mm.

Moreover, the low thermal-expansion outside material 25 is made from 36 wt % Ni-remainder being Fe and has a width of 20 mm, an outer diameter of 42 mm and an inner diameter of 40 mm.

The low thermal-expansion inside material 24 is bonded to the rotor body 22 through an acrylic adhesive (trade name: LOCKTITE 334UV), while the ring-shaped rare earth metal-iron type magnet 23 is bonded to the low thermal-expansion inside material 24 through the same adhesive as mentioned above and also the low thermal-expansion outside material 25 is bonded to the ring-shaped magnet 24 through the same adhesive as mentioned above, whereby the rotor 21 according to the invention is formed.

After the rotor 21 is held in a thermostatic chamber heated to 200 ° C. for 1 hour and then held in a thermostatic chamber cooled to −40° C. for 1 hour, whether the cracking is caused in the ring-shaped rare earth metal-iron type magnet 23 is measured and consequently the occurrence of the cracking is not observed.

Comparative Example 2

Figure 4:
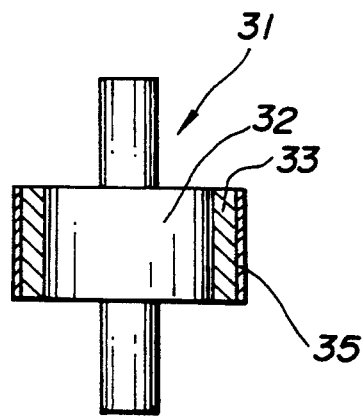
FIG. 4 is a diagrammatically sectional view of a second comparative prior art embodiment of a rotor provided with the ring-shaped magnet.

FIG. 4 shows a second comparative embodiment of the rotor, in which numeral 31 is a rotor, numeral 32 is a rotor body, numeral 33 is a ring-shaped rare earth metal-iron type magnet and numeral 35 is a coating arranged outside the ring-shaped magnet 33 for the prevention of scattering and the improvement of corrosion resistance.

The rotor body 32 is made from a carbon steel of S45C, in which a large-diameter portion has a width of 20 mm and an outer diameter of 33 mm.

Furthermore, the ring-shaped rare earth metal-iron type magnet 33 is made from 28 wt % Nd-2 wt % Dy-0.8 wt % B-3 wt % Co-0.5 wt % Mo-0.1 wt % Ta-0.1 wt % C-remainder being Fe and has a width of 20 mm, an outer diameter of 40 mm and an inner diameter of 33 mm.

Moreover, the coating 35 is made from a ferritic stainless steel of SUS430 and has a width of 20 mm, an outer diameter of 42 mm and an inner diameter of 40 mm.

The ring-shaped rare earth metal-iron type magnet 33 is bonded to the rotor body 32 through an acrylic adhesive (trade name: LOCKTITE 334UV), while the coating 35 is bonded to the ring-shaped magnet 33 through the same adhesive as mentioned above to form the rotor 31.

After the rotor 31 is held in a thermostatic chamber heated to 200° C. for 1 hour and then held in a thermostatic chamber cooled to −40° C. for 1 hour, whether the cracking is caused in the ring-shaped rare earth metal-iron type magnet 33 is measured and consequently the cracking is caused at 3 positions in a cylindrical axial direction.

As mentioned above, according to the invention, the low thermal-expansion inside material is inserted between the rotor body and the ring-shaped rare earth metal-iron type magnet in the rotor, so that the magnetic pole can be easily set at an optional position, while even if the temperature of the rotor rises and the difference in thermal expansion between the rotor body and the ring-shaped magnetic occurs, the thermal expansion difference is absorbed by the low thermal-expansion inside material, therefore, the cracking or breakage of the ring-shaped magnet due to the difference in thermal expansion coefficient between the rotor body and the ring-shaped magnet is not caused and hence the concentric accuracy of the ring-shaped magnet to the rotor body can fully be maintained over a long time.

In case of the low thermal-expansion outside material is further arranged on the outer peripheral surface of the ring-shaped magnet, so that even when the rotor is placed in a low-temperature environment, the difference in thermal shrinkage between the ring-shaped magnet and the low thermal-expansion outside material is small. Therefore, the cracking and breakage of the ring-shaped magnet can be prevented, and also even if the ring-shaped magnet is broken, the scattering of the broken magnet can be prevented by the low-expansion outside material, and further the corrosion resistance in the ring-shaped magnet having a poor corrosion resistance can satisfactorily be maintained over a long time.

As a result, the rotors according to the invention can be applied to motors for AC servomotor and the like while sufficiently utilizing tile merit of the ring-shaped magnet capable of optionally setting the magnetic pole.

What is claimed is:

1. A rotor comprising a rotor body, a ring-shaped rare earth metal-iron type magnet arranged around the rotor body, and a low thermal-expansion material inserted between said rotor body and the magnet, wherein said rotor body has a thermal expansion coefficient of $8-25\times10^{-6}/°C.$, said magnet has a thermal expansion coefficient of not more than $3\times10^{-6}/°C.$, and said low thermal-expansion material has a thermal expansion coefficient of not more than $5\times10^{-6}/°C.$ 2. A rotor as set forth in claim 1, wherein a further low thermal-expansion material is arranged on an outer peripheral surface of said magnet.

3. A rotor comprising a rotor body, a ring-shaped rare earth metal-iron type magnet arranged around the rotor body, and a low thermal-expansion material inserted between said rotor body and the magnet, wherein said rotor body has a thermal expansion coefficient of $10-20\times10^{-6}/°C.$, said magnet has a thermal-expansion coefficient of not more than $3\times10^{-6}/°C.$, and said low thermal-expansion material has a thermal expansion coefficient of not more than $5\times10^{-6}/°C.$ 4. A rotor as set forth in claim 3, wherein a further low thermal-expansion material is arranged on an outer peripheral surface of said magnet.

* * * * *